US010135073B2

(12) United States Patent
Fukumoto et al.

(10) Patent No.: US 10,135,073 B2
(45) Date of Patent: Nov. 20, 2018

(54) DISPERSANT FOR RESIN COLLECTORS, MATERIAL FOR RESIN COLLECTORS, AND RESIN COLLECTOR

(71) Applicants: SANYO CHEMICAL INDUSTRIES, LTD., Kyoto (JP); NISSAN MOTOR CO., LTD., Kanagawa (JP)

(72) Inventors: Hiroshi Fukumoto, Kyoto (JP); Yasuhiro Shindo, Kyoto (JP); Manabu Watanabe, Kanagawa (JP); Hiroshi Akama, Kanagawa (JP); Hideaki Horie, Kanagawa (JP)

(73) Assignees: SANYO CHEMICAL INDUSTRIES, LTD., Kyoto (JP); NISSAN MOTOR CO., LTD., Kanagawa (JP)

( * ) Notice: Subject to any disclaimer, the term of this patent is extended or adjusted under 35 U.S.C. 154(b) by 42 days.

(21) Appl. No.: 14/903,314

(22) PCT Filed: Jun. 25, 2014

(86) PCT No.: PCT/JP2014/066866
§ 371 (c)(1),
(2) Date: Jan. 7, 2016

(87) PCT Pub. No.: WO2015/005116
PCT Pub. Date: Jan. 15, 2015

(65) Prior Publication Data
US 2016/0149223 A1 May 26, 2016

(30) Foreign Application Priority Data

Jul. 8, 2013 (JP) .................. 2013-142965

(51) Int. Cl.
*H01M 4/68* (2006.01)
*C08F 293/00* (2006.01)
*H01M 10/0525* (2010.01)
*H01M 4/66* (2006.01)
*H01B 1/22* (2006.01)
*H01B 1/24* (2006.01)
*C08L 67/00* (2006.01)
*C08L 69/00* (2006.01)
*C08F 255/02* (2006.01)
*C08F 255/04* (2006.01)
*C08F 8/50* (2006.01)
*C08L 23/06* (2006.01)
*C08L 23/12* (2006.01)
*C08L 67/04* (2006.01)
*H01M 10/052* (2010.01)

(52) U.S. Cl.
CPC .............. *H01M 4/668* (2013.01); *C08F 8/50* (2013.01); *C08F 255/02* (2013.01); *C08F 255/04* (2013.01); *C08F 293/00* (2013.01); *C08L 23/06* (2013.01); *C08L 23/12* (2013.01); *C08L 67/00* (2013.01); *C08L 67/04* (2013.01); *C08L 69/00* (2013.01); *H01B 1/22* (2013.01); *H01B 1/24* (2013.01); *H01M 10/0525* (2013.01); *H01M 10/052* (2013.01); *H01M 2220/20* (2013.01)

(58) Field of Classification Search
CPC ............. H01M 4/668; H01M 10/0525; H01M 10/052; H01M 2220/20; C08F 8/50; C08F 255/02; C08F 255/04; C08F 293/00; C08L 23/06; C08L 23/12; C08L 67/00; C08L 67/04; C08L 69/00; C08L 51/06; H01B 1/22; H01B 1/24; C08K 3/08
USPC ........ 524/440, 441, 505; 525/280, 281, 301, 525/303
See application file for complete search history.

(56) References Cited

U.S. PATENT DOCUMENTS

| 2006/0147781 A1 | 7/2006 | Cai et al. |
| 2012/0160128 A1 | 6/2012 | Kobayashi et al. |
| 2013/0133922 A1 | 5/2013 | Steffl et al. |
| 2013/0244010 A1* | 9/2013 | Hasegawa ............ C08F 220/08 428/195.1 |

FOREIGN PATENT DOCUMENTS

| CN | 102483976 | 5/2012 |
| EP | 0 859 418 | 8/1998 |
| EP | 2 903 064 | 8/2015 |
| GB | 13 15 617 | 5/1973 |
| JP | 2001270923 A * | 10/2001 |
| JP | 2006-179539 | 7/2006 |
| JP | 2007-180250 | 7/2007 |
| JP | 2010092607 A * | 4/2010 |
| JP | 2011-171185 | 9/2011 |
| JP | 2012-150896 | 8/2012 |
| JP | 2012-150905 | 8/2012 |

(Continued)

OTHER PUBLICATIONS

JP 2001-270923 A (2001), machine translation, JPO Japan Platform for Patent Information (J-PlatPat).*

(Continued)

*Primary Examiner* — Josephine L Chang
(74) *Attorney, Agent, or Firm* — Wenderoth, Lind & Ponack, L.L.P.

(57) ABSTRACT

An object of the present invention is to provide a dispersant for a resin current collector which can uniformly disperse a conductive filler to attain sufficient charge and discharge characteristics without impairing the output power per unit weight of a battery. The present invention provides a dispersant for a resin current collector comprising a polymer having a resin-philic block (A1) and a conductive filler-philic block (A2).

10 Claims, No Drawings

(56) References Cited

FOREIGN PATENT DOCUMENTS

| KR | 10-1998-0071401 | 10/1998 | | |
|----|----|----|----|----|
| WO | 98/21278 | 5/1998 | | |
| WO | 2005/004170 | 1/2005 | | |
| WO | WO-2012070252 A1 * | 5/2012 | ............ | C08F 220/08 |
| WO | 2013/062088 | 5/2013 | | |

OTHER PUBLICATIONS

JP 2010-092607 A, machine translation, JPO Japan Platform for Patent Information (J-PlatPat). (Year: 2010).*
Machine Translation of Ref. JP 2006-179539 submitted in the IDS filed on Jan. 7, 2016.
Machine Translation of Ref. JP 2007-180250 submitted in the IDS filed on Jan. 7, 2016.
Machine Translation of Ref. JP 2012-150896 submitted in the IDS filed on Jan. 7, 2016.
Machine Translation of Ref. JP 2012-150905 submitted in the IDS filed on Jan. 7, 2016.
Machine Translation of Ref. JP 11-144737 submitted in the IDS filed on Jan. 7, 2016.
Machine Translation of JP 2013-062088 which corresponds to Ref. WO 2013/062088 submitted in the IDS filed on Jan. 7, 2016.
International Search Report dated Sep. 16, 2014 in International Application No. PCT/JP2014/066866.

* cited by examiner

DISPERSANT FOR RESIN COLLECTORS, MATERIAL FOR RESIN COLLECTORS, AND RESIN COLLECTOR

TECHNICAL FIELD

The present invention relates to a dispersant for a resin current collector, a material for a resin current collector, and a resin current collector.

BACKGROUND ART

A reduction in emission of carbon dioxide has been strongly desired for environmental protection in recent years. The automobile industry has placed great expectation on electric vehicles (EV) and hybrid electric vehicles (HEV) introduced to reduce emission of carbon dioxide, and thus has been extensively developing secondary batteries for driving motors, which are the key to practical use of EVs and HEVs. Among those secondary batteries, lithium ion secondary batteries have received attention because high energy density and high output power density can be attained.

A typical lithium ion secondary battery includes electrodes composed of a positive electrode current collector onto which a positive electrode active material is applied together with a binder and a negative electrode current collector onto which a negative electrode active material is applied together with a binder. A bipolar battery includes a bipolar electrode composed of a current collector having a positive electrode layer formed by applying a positive electrode active material and the like together with a binder onto one surface of the current collector and a negative electrode layer formed by applying a negative electrode active material and the like together with a binder onto the other surface thereof.

Such lithium ion secondary batteries typically include metallic foil (metallic current collecting foil) as current collectors. The so-called resin current collectors composed of resins containing metal powder have been proposed instead of the metallic foil (see Patent Literature 1, for example) in recent years. Such resin current collectors are lighter than the metallic current collecting foil and expected to improve output power per unit weight of a battery.

Unfortunately, the traditional resin current collectors contain conductive fillers insufficiently dispersed, reducing the performance of the battery, such as charge and discharge characteristics.

Dispersion of the conductive fillers is slightly but insufficiently enhanced by commonly known dispersants (such as carboxymethyl cellulose and surfactants). Accordingly, a resin current collector containing a conductive filler uniformly dispersed is desired.

CITATION LIST

Patent Literature

Patent Literature 1: JP 2012-150896 A

SUMMARY OF INVENTION

Technical Problem

An object of the present invention is to provide a dispersant for a resin current collector which can uniformly disperse a conductive filler to attain sufficient charge and discharge characteristics without impairing the output power per unit weight of a battery enhanced by a reduction in the weight of a resin current collector as a feature of the resin current collector, a material for a resin current collector, and a resin current collector.

Solution to Problem

The present inventors conducted extensive research to solve the above problems and achieved the present invention.

Namely, the present invention provides a dispersant for a resin current collector (A) comprising a polymer having a resin-philic block (A1) and a conductive filler-philic block (A2), wherein the resin-philic block (A1) is a polymer block composed of an olefin (a1) having 2 to 30 carbon atoms as an essential constituent monomer and a functional group contained in the conductive filler-philic block (A2) is at least one selected from the group consisting of a carboxyl group, a 1,3-dioxo-2-oxapropylene group, an ester group, a cyano group, a hydroxyl group, an amino group, an amide group, and an imide group, or the polymer having the resin-philic block (A1) and the conductive filler-philic block (A2) is a ring-opening polymerization type polyester, a dehydration condensation type polyester, or a polycarbonate; a material for a resin current collector comprising the dispersant for a resin current collector (A), a resin (B), and a conductive filler (C); and a resin current collector containing the material for a resin current collector.

Advantageous Effects of Invention

The dispersant for a resin current collector and the material for a resin current collector according to the present invention provide a resin current collector containing a conductive filler uniformly dispersed, attaining batteries having sufficient charge and discharge characteristics.

DESCRIPTION OF EMBODIMENTS

The present invention will now be described in detail.

The dispersant for a resin current collector (A) according to the present invention is a dispersant for a resin current collector comprising a polymer having a resin-philic block (A1) and a conductive filler-philic block (A2), wherein the resin-philic block (A1) is a polymer block composed of an olefin (a1) having 2 to 30 carbon atoms as an essential constituent monomer and a functional group having the conductive filler-philic block (A2) is at least one selected from the group consisting of a carboxyl group, a 1,3-dioxo-2-oxapropylene group, an ester group, a cyano group, a hydroxyl group, an amino group, an amide group, and an imide group, or the polymer having the resin-philic block (A1) and the conductive filler-philic block (A2) is a ring-opening polymerization type polyester, a dehydration condensation type polyester, or a polycarbonate.

In the dispersant for a resin current collector (A) according to the present invention, the resin-philic block (A1) has a small absolute value of the difference between the solubility parameter (hereinafter abbreviated as SP value) of the resin-philic block (A1) and the SP value of the resin (B) described later, |{SP value of (B)}−{SP value of (A1)}|.

The resin-philic block (A1) according to the present invention is a polymer block composed of an olefin (a1) having 2 to 30 carbon atoms as an essential constituent monomer.

Examples of the polymer block composed of an olefin (a1) having 2 to 30 carbon atoms as an essential constituent monomer include polymer blocks prepared by (co)polymerizing one or more monomers (a1), and polymer blocks prepared by copolymerizing one or more monomers (a1) with one or more different monomers (b1).

Examples of the olefin (a1) having 2 to 30 carbon atoms include alkenes having 2 to 30 carbon atoms (hereinafter abbreviated as C), such as alkenes having 2 to 3 carbon atoms (ethylene and propylene), and α-olefins having 4 to 30 carbon atoms (such as 1-butene, isobutene, 1-hexene, 1-decene, and 1-dodecene).

Examples of the different monomer (b1) include unsaturated monomers having 4 to 30 carbon atoms copolymerizable with the olefin (a1) having 2 to 30 carbon atoms other than the olefin (a1) and an ethylenically unsaturated monomer (a2) described later. Specific examples of the different monomer (b1) include styrene and vinyl acetate.

Examples of the resin-philic block (A1) include the followings (A11) to (A14):

(A11) polymer block composed of ethylene as an essential constituent monomer (polyethylene block)

Examples thereof include high, middle, or low density polyethylene, and polymer blocks prepared by copolymerizing ethylene with the α-olefin having 4 to 30 carbon atoms and/or the different monomer (b1).

(A12) polymer block composed of propylene as an essential constituent monomer (polypropylene block)

Examples thereof include polypropylene, and polymer blocks prepared by copolymerizing propylene with the α-olefin having 4 to 30 carbon atoms and/or the different monomer (b1).

(A13) polymer block composed of ethylene and propylene as essential constituent monomers Examples thereof include polymer blocks prepared by copolymerizing ethylene with propylene, and polymer blocks prepared by copolymerizing ethylene and propylene with the α-olefin having 4 to 30 carbon atoms and/or the different monomer (b1).

(A14) polymer block composed of olefin having 4 to 30 carbon atoms as an essential constituent monomer Examples thereof include polybutene.

Among these, preferred are the polymer blocks (A11) to (A13), more preferred are polyethylene, polypropylene, polymer blocks prepared by copolymerizing ethylene with propylene, and polymer blocks prepared by copolymerizing propylene with the monomer (b1), and still more preferred are polyethylene, polypropylene, and polymer blocks prepared by copolymerizing ethylene with propylene in view of the battery characteristics.

The functional group contained in the conductive filler-philic block (A2) according to the present invention is at least one selected from the group consisting of a carboxyl group (—COOH), a 1,3-dioxo-2-oxapropylene group (—CO—O—CO—), an ester group (—COO—), a cyano group (—CN), a hydroxyl group (—OH), an amino group (—NHR where R is a hydrogen atom or any substituent; the same applies to an amide group and an imide group), an amide group (—NR—CO—), and an imide group (—CO—NR—CO—).

The conductive filler-philic block (A2) may be composed of only a carboxyl group, a 1,3-dioxo-2-oxapropylene group, an ester group, a cyano group, a hydroxyl group, an amino group, an amide group, or an imide group, or may be composed of at least one functional group selected from the group consisting of a carboxyl group, a 1,3-dioxo-2-oxapropylene group, an ester group, a cyano group, a hydroxyl group, an amino group, an amide group, and an imide group and one or more carbon atoms bonded to the functional group.

The conductive filler-philic block (A2) may be a polymer block composed of an ethylenically unsaturated monomer (a2) as an essential constituent monomer, the monomer (a2) having at least one functional group selected from the group consisting of a carboxyl group, a 1,3-dioxo-2-oxapropylene group, an ester group, a cyano group, a hydroxyl group, an amino group, an amide group, and an imide group.

If the ethylenically unsaturated monomer (a2) having the at least one functional group selected from the group consisting of a carboxyl group, a 1,3-dioxo-2-oxapropylene group, an ester group, a cyano group, a hydroxyl group, an amino group, an amide group, and an imide group is used as a raw material monomer, a polymer block having the at least one functional group selected from the group consisting of a carboxyl group, a 1,3-dioxo-2-oxapropylene group, an ester group, a cyano group, a hydroxyl group, an amino group, an amide group, and an imide group, namely the conductive filler-philic block (A2) can be readily introduced into the polymer.

Examples of the ethylenically unsaturated monomer (a2) include an ethylenically unsaturated monomer (a21) having a carboxyl group, an ethylenically unsaturated monomer (a22) having a 1,3-dioxo-2-oxapropylene group, an ethylenically unsaturated monomer (a23) having an ester group, an ethylenically unsaturated monomer (a24) having a cyano group, an ethylenically unsaturated monomer (a25) having a hydroxyl group, an ethylenically unsaturated monomer (a26) having an amino group, an ethylenically unsaturated monomer (a27) having an amide group, an ethylenically unsaturated monomer (a28) having an imide group, and an ethylenically unsaturated monomer (a29) having two or more of the functional groups.

Examples of the ethylenically unsaturated monomer (a21) having a carboxyl group include monocarboxylic acids [including those having 3 to 15 carbon atoms, such as (meth)acrylic acid, crotonic acid, and cinnamic acid], dicarboxylic acids [such as aliphatic compounds (including those having 4 to 24 carbon atoms, such as maleic acid, fumaric acid, itaconic acid, citraconic acid, and mesaconic acid), aromatic compounds (including those having 10 to 24 carbon atoms, such as dicarboxystyrene), and alicyclic compounds (including those having 8 to 24 carbon atoms, such as dicarboxycyclohexene and dicarboxycycloheptene)], tri-, tetra-, or penta- valent polycarboxylic acids [such as aliphatic compounds (including those having 6 to 24 carbon atoms, such as aconitic acid) and alicyclic compounds (including those having 7 to 24 carbon atoms, such as tricarboxycyclopentene, tricarboxycyclohexene, and tricarboxycyclooctene)], alkyl (having 1 to 18 carbon atoms) esters of polyvalent carboxylic acids (such as maleic acid monomethyl ester, fumaric acid monoethyl ester, itaconic acid mono-t-butyl ester, mesaconic acid monodecyl ester, and dicarboxycycloheptene didodecyl ester), and salts thereof (alkali metal salts and ammonium salts).

Examples of the ethylenically unsaturated monomer (a22) having a 1,3-dioxo-2-oxapropylene group include anhydrides of the dicarboxylic acids or the polycarboxylic acids (including those having 4 to 24 carbon atoms, such as maleic anhydride, itaconic anhydride, citraconic anhydride, and aconitic anhydride).

Examples of the ethylenically unsaturated monomer (a23) having an ester group include methyl(meth)acrylate, ethyl (meth)acrylate, propyl(meth)acrylate, and butyl(meth)acrylate.

In the present invention, the term "(meth)acrylate" indicates acrylate and/or methacrylate.

Examples of the ethylenically unsaturated monomer (a24) having a cyano group include (meth)acrylonitriles.

Examples of the ethylenically unsaturated monomer (a25) having a hydroxyl group include those having 4 to 20 carbon atoms, and specific examples thereof include hydroxystyrene, hydroxymethyl(meth)acrylate, hydroxyethyl(meth)acrylate, hydroxypropyl(meth)acrylate, (meth)allyl alcohol, 1-buten-3-ol, 2-buten-1-ol, 2-buten-1,4-diol, propargyl alcohol, and 2-hydroxyethyl propenyl ether.

Examples of the ethylenically unsaturated monomer (a26) having an amino group include (meth)acrylates having 5 to 15 carbon atoms and having a primary or secondary amino group [such as aminoalkyl (having 1 to 6 carbon atoms) (meth)acrylate {such as aminoethyl(meth)acrylate} and alkyl (having 1 to 6 carbon atoms) aminoalkyl (having 1 to 6 carbon atoms) (meth)acrylates {such as t-butylaminoethyl (meth)acrylate}], and allyl compounds having 3 to 10 carbon atoms and having an amino group [such as (meth)allylamine and diallylamine].

Examples of the ethylenically unsaturated monomer (a27) having an amide group include (meth)acrylamide compounds having 3 to 30 carbon atoms [such as (meth)acrylamide; N-alkyl (having 1 to 6 carbon atoms) (meth)acrylamides {such as N-methyl(meth)acrylamide, N-butyl (meth)acrylamide, diacetone acrylamide, and N,N'-methylenebis(meth)acrylamide}; and N,N-dialkyl (having 1 to 6 carbon atoms) or diaralkyl (having 7 to 15 carbon atoms) (meth)acrylamide {such as N,N-dimethylacrylamide and N,N-dibenzylacrylamide}], vinyl compounds having 4 to 20 carbon atoms and having an amide group other than the (meth)acrylamide compounds {such as methacrylformamide, N-methyl-N-vinylacetoamide, cinnamic amide, cyclic amide (such as N-vinylpyrrolidone and N-allylpyrrolidone)}, vinyl compounds having a quaternary ammonium group [such as quaternized products (those quaternized with a quaternizing agent such as a methyl chloride, dimethyl sulfate, benzyl chloride, and dimethyl carbonate) of dimethylaminoethyl(meth)acrylamide and vinyl compounds having a tertiary amino group {such as diethylaminoethyl (meth)acrylamide}].

Examples of the ethylenically unsaturated monomer (a28) having an imide group include those having 4 to 24 carbon atoms, such as maleic imide, itaconic imide, citraconic imide, and dicarboxycycloheptaneimide. R in the imide group (—CO—NR—CO—) is preferably a hydrogen atom or alkyl groups having 1 to 6 carbon atoms.

Examples of the ethylenically unsaturated monomer (a29) having two or more functional groups include those having two or more functional groups selected from the group consisting of a carboxyl group, a 1,3-dioxo-2-oxapropylene group, an ester group, a cyano group, a hydroxyl group, an amino group, an amide group, and an imide group. Specific examples thereof include ethylenically unsaturated monomers having a carboxyl group and an amide group {such as alkyl (having 1 to 18 carbon atoms) amides of polyvalent carboxylic acids (including those having 4 to 60 carbon atoms, such as maleic monoamide, maleic monomethylamide, fumaric monoethylamide, mesaconic monodecylamide, and dicarboxycycloheptenemonododecylamide)}, and ethylenically unsaturated monomers having an amino group and an amide group {acrylamides having 5 to 10 carbon atoms and having an amino group [such as N-aminoalkyl (having 1 to 6 carbon atoms) (meth)acrylamide and N-aminoethyl(meth)acrylamide]}.

These ethylenically unsaturated monomers (a2) can be used alone or in combination of two or more.

Among these ethylenically unsaturated monomers (a2), preferred are the ethylenically unsaturated monomer (a21) having a carboxyl group and the ethylenically unsaturated monomer (a22) having a 1,3-dioxo-2-oxapropylene group, more preferred is maleic anhydride in view of the electrochemical stability.

The conductive filler-philic block (A2) may be copolymerized with a different vinyl monomer (b2) besides the ethylenically unsaturated monomer (a2).

The different vinyl monomer (b2) may be any vinyl monomer copolymerizable with the ethylenically unsaturated monomer (a2) other than the monomers (a1) and (a2). Examples of usable vinyl monomers include those listed below.

Alicyclic vinyl monomers: including alicyclic vinyl monomers having 3 to 20 carbon atoms. Specific examples thereof include cyclohexene, (di)cyclopentadiene, pinene, limonene, indene, vinylcyclohexene, and ethylidene bicycloheptene.

Aromatic vinyl monomers: including aromatic vinyl monomers having 8 to 14 carbon atoms. Specific examples thereof include styrene, α-methylstyrene, vinyl toluene, 2,4-dimethylstyrene, ethylstyrene, isopropylstyrene, butylstyrene, phenylstyrene, cyclohexylstyrene, benzylstyrene, crotylbenzene, and vinylnaphthalene.

Vinyl monomers containing a halogen element: including vinyl monomers having 2 to 20 carbon atoms and containing a halogen element. Specific examples thereof include vinyl chloride, vinyl bromide, vinylidene chloride, allyl chloride, chlorostyrene, bromostyrene, dichlorostyrene, chloromethylstyrene, tetrafluorostyrene, and chloroprene.

The proportion of the ethylenically unsaturated monomer (a2) forming the conductive filler-philic block (A2) is preferably 50 to 100% by weight, more preferably 60 to 100% by weight, particularly preferably 70 to 100% by weight based on the weight of the conductive filler-philic block (A2) in view of the dispersion of the conductive filler (C).

The total molarity of the carboxyl group (—COOH), the 1,3-dioxo-2-oxapropylene group (—CO—O—CO—), the ester group (—COO—), the cyano group (—CN), the hydroxyl group (—OH), the amino group (—NHR), the amide group (—NR—CO—), and the imide group (—CO—NR—CO—) in the conductive filler-philic block (A2) is preferably 0.0001 to 0.03 mol/g, more preferably 0.001 to 0.028 mol/g, particularly preferably 0.01 to 0.025 mol/g of the weight of the conductive filler-philic block (A2) in view of the dispersion of the conductive filler (C).

The total molarity of the functional groups in the conductive filler-philic block (A2) can be calculated from the amounts of the monomers (a2) and (b2) charged in preparation of the dispersant (A) using the following expression.

Total molarity=Σ{(amount of monomer(s) (a2) charged)/(molecular weight of monomer(s) (a2) used)}/{total amounts of monomers (a2) and (b2) charged}

In the ethylenically unsaturated monomer (a29) having two or more functional groups, the molarity is calculated assuming that the "amount of monomer(s) (a2) charged" is a value obtained by multiplying the amounts of the monomer(s) (a2) charged by the number of functional groups.

The total concentration of the carboxyl group (—COOH), the 1,3-dioxo-2-oxapropylene group (—CO—O—CO—), the ester group (—COO—), the cyano group (—CN), the hydroxyl group (—OH), the amino group (—NHR), the amide group (—NR—CO—), and the imide group (—CO—NR—CO—) in the dispersant for a resin current collector (A) is preferably 1 to 40% by weight, more preferably 1 to 30% by weight, still more preferably 1.2 to 20% by weight, particularly preferably 1.4 to 10% by weight based on the weight of the dispersant (A) in view of the dispersion of the conductive filler.

The total concentration of the functional groups in the dispersant (A) can be calculated from the amounts of the monomers (a1), (a2), (b1), and (b2) charged in preparation of the dispersant (A) using the following expression.

Total concentration=Σ{(total of atomic weights in parentheses of functional groups contained in monomer(s) (a2))×(amount of monomer(s) (a2) charged)/(molecular weight of monomer(s) (a2) used)}/{total amount of monomers (a1), (a2), (b1), and (b2) charged}×100

The total molarity of the carboxyl group (—COOH), the 1,3-dioxo-2-oxapropylene group (—CO—O—CO—), the ester group (—COO—), the cyano group (—CN), hydroxyl group (—OH), the amino group (—NHR), the amide group (—NR—CO—), and the imide group (—CO—NR—CO—) in the dispersant for a resin current collector (A) is preferably 0.00005 to 0.015 mol/g, more preferably 0.0005 to 0.014 mol/g of the weight of the dispersant (A) in view of the dispersion of the conductive filler.

The total molarity of the functional group(s) in the dispersant (A) can be calculated by measuring the dispersant (A) by $^{13}$C-NMR and infrared spectroscopy (IR), and applying the results to the calibration curves determined from samples having known molarities.

The total molarity of the functional group(s) in the dispersant (A) can also be calculated from the amounts of the monomers (a1), (a2), (b1), and (b2) charged in preparation of the dispersant (A) using the following expression.

Total molarity=Σ{(amount of monomer(s) (a2) charged)/(molecular weight of monomer(s) (a2) used)}/{total amount of monomers (a1), (a2), (b1), and (b2) charged}

The polymer having the resin-philic block (A1) and the conductive filler-philic block (A2) may be a ring-opening polymerization type polyester, a dehydration condensation type polyester, or a polycarbonate.

If the polymer having the resin-philic block (A1) and the conductive filler-philic block (A2) is a ring-opening polymerization type polyester or a dehydration condensation type polyester, the ester group corresponds to the conductive filler-philic block (A2), and portions (alkyl chain) other than the ester group correspond to the resin-philic block (A1).

If the polymer having the resin-philic block (A1) and the conductive filler-philic block (A2) is a polycarbonate, the 1,3-dioxo-2-oxapropylene group (carbonate group) (—O—(CO)—O—) corresponds to the conductive filler-philic block (A2), and portions (alkyl chain) other than the carbonate group correspond to the resin-philic block (A1).

If a carboxyl group, a 1,3-dioxo-2-oxapropylene group, an ester group, a cyano group, a hydroxyl group, an amino group, an amide group, or an imide group is present in portions (alkyl chain) other than the ester group of the ring-opening polymerization type polyester and the dehydration condensation type polyester, these substituents are considered as the conductive filler-philic block (A2) and other portions excluding these substituents are considered as the resin-philic block (A1).

If a carboxyl group, a 1,3-dioxo-2-oxapropylene group, an ester group, a cyano group, a hydroxyl group, an amino group, an amide group, or an imide group is present in portions (alkyl chain) other than the 1,3-dioxo-2-oxapropylene group (carbonate group) of the polycarbonate, portions excluding these substituents are considered as the resin-philic block (A1).

The weight ratio of the resin-philic block (A1) to the conductive filler-philic block (A2) {(A1)/(A2)} can be appropriately controlled by varying the polymer structure (such as the number of carbon atoms) of the raw material for the polymer.

The ring-opening polymerization type polyester is prepared through ring-opening polymerization of one or more lactones having 3 to 12 carbon atoms (such as β-propiolactone, γ-butyrolactone, γ-valerolactone, δ-valerolactone, ε-caprolactone, or ζ-enantholactone). Examples of the ring-opening polymerization type polyester include polypropiolactone, polybutyrolactone, polycaprolactone, and polyvalerolactone.

The lactone is preferably α-valerolactone, δ-valerolactone, or ε-caprolactone, and is more preferably ε-caprolactone in consideration of the weight ratio of the resin-philic block (A1) to the conductive filler-philic block (A2).

The dehydration condensation type polyester is prepared through dehydration condensation of a low molecular weight (Mn: less than 300) polyhydric alcohol with a polyvalent carboxylic acid having 2 to 10 carbon atoms or an ester-formable derivative thereof.

Usable low molecular weight polyhydric alcohols are aliphatic polyhydric alcohols having an Mn of less than 300 and a valence of 2 to 8 or more and alkylene oxide (representing EO, PO, 1,2-, 1,3-, 2,3-, or 1,4-butylene oxide or the like, and hereinafter abbreviated as AO) low mol adducts of phenols having an Mn of less than 300 and a valence of 2 to 8 or more.

Among these low molecular weight polyhydric alcohols usable for the dehydration condensation type polyester, preferred are ethylene glycol, propylene glycol, 1,4-butanediol, neopentyl glycol, 1,6-hexane glycol, EO or PO low mol adducts of bisphenol A, and combinations thereof.

Examples of the polyvalent carboxylic acid having 2 to 10 carbon atoms or the ester-formable derivative thereof include aliphatic dicarboxylic acids (such as succinic acid, adipic acid, azelaic acid, sebacic acid, fumaric acid, and maleic acid), alicyclic dicarboxylic acids (such as dimer acid), aromatic dicarboxylic acids (such as terephthalic acid, isophthalic acid, and phthalic acid), tri- or higher functional polycarboxylic acids (such as trimellitic acid and pyromellitic acid), anhydrides thereof (such as succinic anhydride, maleic anhydride, phthalic anhydride, and trimellitic anhydride), acid halides thereof (such as adipic dichloride), and low molecular weight alkyl esters thereof (such as dimethyl succinate and dimethyl phthalate). These can be used in combination.

Specific examples of the dehydration condensation type polyester include poly(ethylene adipate), poly(butylene adipate), poly(hexamethylene adipate), poly(hexamethylene isophthalate), poly(neopentyl adipate), poly(ethylenepropylene adipate), poly(ethylenebutylene adipate), poly(butylenehexamethylene adipate), poly(diethylene adipate), poly(polytetramethylene ether) adipate, poly(3-methylpentylene adipate), poly(ethylene azelate), poly(ethylene sebacate), poly(butylene azelate), poly(butylene sebacate), and poly(neopentyl terephthalate).

Examples of the polycarbonate include polycarbonates prepared through condensation of the low molecular weight polyhydric alcohol with a low molecular carbonate compound (such as dialkyl carbonate having an alkyl group having 1 to 6 carbon atoms, alkylene carbonate having an alkylene group having 2 to 6 carbon atoms, and diaryl carbonate having an aryl group having 6 to 9 carbon atoms) while dealcoholization reaction is being performed. These low molecular weight polyhydric alcohols and low molecular weight carbonate compounds each can be used in combination of two or more.

Specific examples of the polycarbonate include poly (hexamethylene carbonate), poly(pentamethylene carbonate), poly(tetramethylene carbonate), and poly(tetramethylene/hexamethylene) carbonate (such as those prepared through condensation of 1,4-butane diol and 1,6-hexane diol with dialkyl carbonate while dealcoholization reaction is being performed).

Examples of the method of preparing the dispersant for a resin current collector (A) include a method of preparing a polymer (A'1) {such as a polymer prepared through polymerization of a monomer comprising the olefin (a1) and when necessary the monomer (b1)} by a standard method of preparing an olefin polymer {such as a bulk method, a solution method, a slurry method, and a gas phase method}, introducing an unsaturated group into the polymer (A'1) through a thermal degradation reaction to prepare a polymer (A"1), and adding the polymer (A"1) to the ethylenically unsaturated monomer (a2) {containing the monomer (b2) when necessary}; a method using a ring-opening polymerization reaction of lactone; a method using a dehydration condensation reaction of a polyvalent carboxylic acid with a polyhydric alcohol; and a method using a dealcoholization condensation reaction of a polyhydric alcohol and a carbonate compound.

In the solution method, a catalyst and a monomer are charged into a solvent to perform polymerization in the solution.

Examples of the solvent used in the solution method include saturated hydrocarbons [such as aliphatic hydrocarbons (including those having 3 to 24 carbon atoms, such as propane, butane, hexane, octane, decane, dodecane, hexadecane, and octadecane); alicyclic hydrocarbons (including those having 3 to 24 carbon atoms, such as cyclopentane, methylcyclopentane, cyclohexane, and cyclooctane); aromatic hydrocarbons (including those having 6 to 12 carbon atoms, such as benzene, toluene, and xylene); petroleum fractions (including those having 12 to 60 carbon atoms, such as gasoline, kerosene, and light oil)]; and olefins which are liquid during polymerization (including those having 31 to 100 carbon atoms, such as low molecular weight polyolefins).

In the slurry method, a catalyst and a monomer are charged into a dispersive medium, and polymerization is performed in a slurry state.

Examples of the dispersive medium include the saturated hydrocarbons and the olefins which are liquid during polymerization.

In the gas phase method, a catalyst and a monomer are charged into a gas phase, and polymerization is performed in the gas phase. Specifically, the catalyst is gradually charged into a reactor, and the monomer is charged so as to efficiently contact the catalyst to perform polymerization in the gas phase. The prepared polymer descends its own weight, and is recovered from the bottom of the reactor. The molecular weight can be controlled by a known method, such as selection of temperature, pressure, the amount of hydrogenation.

The polymerization temperature in the gas phase method is preferably 0 to 120° C., more preferably 20 to 100° C. in view of the dispersion of the conductive filler (C) and the molecular weight distribution of the resin-philic block (A1).

The polymerization temperature in the solution method is preferably 0 to 200° C., more preferably 10 to 180° C. in view of the dispersion of the conductive filler (C) and the molecular weight distribution of the resin-philic block (A1).

The polymerization temperature in the slurry method is preferably −50 to 100° C., more preferably 0 to 90° C. in view of the dispersion of the conductive filler (C) and the molecular weight distribution of the resin-philic block (A1).

The pressure in the gas phase method is preferably 0.049 to 9.8 MPa, more preferably 0.098 to 4.9 MPa in view of the dispersion of the conductive filler (C), the molecular weight distribution of the resin-philic block (A1), and economical efficiency.

The pressure in the solution method and the slurry method is preferably 0.078 to 0.98 MPa, more preferably 0.098 to 0.49 MPa in view of the dispersion of the conductive filler (C), the molecular weight distribution of the resin-philic block (A1), and economical efficiency.

If the polymer (A'1) comprises two or more olefins (a1) {and further comprises the monomer (b1) when necessary}, the olefins (a1) may be copolymerized by any of random polymerization, block polymerization, and graft polymerization.

The number average molecular weight of the polymer (A'1) (hereinafter abbreviated as Mn) is preferably 10,000 to 300,000, preferably 15,000 to 150,000 in view of the dispersion of the conductive filler (C) and the molecular weight of the dispersant for a resin current collector.

The Mn of the polymer (A'1) can be determined through a measurement by gel permeation chromatography (GPC) on the following conditions:

Apparatus: Alliance GPC V2000 (manufactured by Waters Corporation)
Solvent: ortho-dichlorobenzene
Standard substance: polystyrene
Sample concentration: 3 mg/ml
Column stationary phase: two columns of PLgel 10 μm and MIXED-B connected in series (manufactured by Polymer Laboratories Ltd.)
Column temperature: 135° C.

The polymer (A'1) can be thermally degraded to prepare a polymer (A"1) having an unsaturated group introduced thereinto. As used herein, the term "thermal degradation" is defined as an operation to heat treat a polymer at a temperature of 180 to 450° C. (preferably 220 to 400° C.) to control the reduction ratio $Mn_2/Mn_1$ of the Mn of the polymer after the treatment ($Mn_2$) to the Mn of the polymer before the treatment ($Mn_1$) to be 0.9 to 0.001.

The number of double bonds at molecular terminals and/or in the molecule is 0.2 to 10, preferably 0.3 to 6, particularly preferably 0.5 to 5 per 1,000 carbon atoms in the polymer (A"1) having an unsaturated group introduced thereinto, in view of ease of introducing the ethylenically unsaturated monomer (a2).

The number of double bonds can be measured by nucleus magnetic resonance (NMR).

Preferred methods of preparing a polymer (A"1) having an unsaturated group introduced thereinto are thermal degradation methods (such as methods described in JP S43-9368 B, JP S44-29742 B, and JP H06-70094 B) in view of the dispersion of the conductive filler (C).

The thermal degradation method includes a method of thermally degrading the polymer (A'1) (1) in a continuous manner or (2) in batch.

In the method (1), an olefin polymer fed to a continuous tank at a constant flow rate (10 to 700 kg/h) is continuously thermally degraded preferably at 300 to 450° C. for 0.5 to 10 hours in the absence of an radical initiator and preferably at 180 to 300° C. for 0.5 to 10 hours in the presence of a radical initiator. In the method (2), an olefin polymer in a closed reactor is thermally degraded in the absence of or in the presence of an organic peroxide in the same manner on the same heat treatment conditions as in the method (1).

Examples of the apparatus used in the method (1) include continuous kneaders (such as static mixers, trade name "FCM" manufactured by Farrel Corporation, trade name "LCM" manufactured by Kobe Steel, Ltd., and trade name "CIM" manufactured by The Japan Steel Works, Ltd., single screw extruders, and twin screw extruders.

Examples of the radical initiator include azo compounds (such as azobisisobutyronitrile and azobisisovaleronitrile), peroxides [monofunctional initiators (having one peroxide group in the molecule) [such as benzoyl peroxide, di-t-butyl peroxide, lauroyl peroxide, and dicumyl peroxide] and polyfunctional initiators (having two or more peroxide groups in the molecule) [such as 2,2-bis(4,4-di-t-butylperoxycyclohexyl)propane, 1,1-bis(t-butylperoxy)-3,3,5-trimethylcyclohexane, di-t-butylperoxy hexahydroterephthalate, diallylperoxy dicarbonate, and t-butylperoxyallyl carbonate]].

The amount of the radical initiator to be used is preferably 0.01 to 10% by weight, more preferably 0.1 to 1% by weight based on the weight of the polymer (A'1) in view of the dispersion of the conductive filler (C) and the molecular weight distribution of the dispersant (A).

Among these thermal degradation methods, preferred is the method (1) in view of the molecular weight, and particularly preferred is a method of continuously thermally degrading the polymer (A'1) in the absence of the radical initiator at 300 to 450° C. for 0.5 to 10 hours while the polymer (A'1) is being fed at a constant flow rate.

Examples of the method of adding an ethylenically unsaturated monomer (a2) {containing the monomer (b2) when necessary} into the polymer (A"1) having an unsaturated group introduced thereinto include a method of heat melting the polymer (A"1) having an unsaturated group introduced thereinto and the ethylenically unsaturated monomer (a2) or suspending or dissolving these (A"1) and (a2) in an appropriate organic solvent, adding the radical initiator as a radical initiator (k) [or a solution of the radical initiator (k) dissolved in an appropriate organic solvent], and stirring these components with heating (a melting method, a suspension method, and a solution method); and a method of preliminarily mixing the polymer (A"1) having an unsaturated group introduced thereinto and the ethylenically unsaturated monomer (a2) {when necessary the monomer (b2)}, and melt-kneading these components (melt-kneading method).

The same radical initiators listed above can be used as the radical initiator (k). Specific examples thereof include azo compounds (azobisisobutyronitrile and azobisisovaleronitrile); peroxides [monofunctional initiators (having one peroxide group in the molecule) [such as benzoyl peroxide, di-t-butyl peroxide, lauroyl peroxide, and dicumyl peroxide], and polyfunctional initiators (having 2 to 4 or more peroxide groups in the molecule) [such as 2,2-bis(4,4-di-t-butylperoxycyclohexyl)propane, 1,1-bis(t-butylperoxy)3,3,5-trimethylcyclohexane, di-t-butylperoxy hexahydroterephthalate, diallylperoxy dicarbonate, and t-butylperoxyallyl carbonate]].

Among these radical initiators, preferred are the peroxides, more preferred are the monofunctional initiators, and particularly preferred are di-t-butyl peroxide, lauroyl peroxide, and dicumyl peroxide in view of the reactivity of the ethylenically unsaturated monomer (a2) to the polymer (A"1) having an unsaturated group introduced thereinto.

The amount of the radical initiator (k) to be used is preferably 0.001 to 10% by weight, more preferably 0.01 to 5% by weight, particularly preferably 0.1 to 3% by weight based on the weight of the dispersant (A) in view of the reaction rate of the ethylenically unsaturated monomer (a2) to the resin-philic block having an unsaturated group introduced thereinto.

Examples of the organic solvent include solvents having 3 to 18 carbon atoms such as hydrocarbons (such as hexane, heptane, octane, decane, dodecane, benzene, toluene, and xylene), halogenated hydrocarbons (such as di-, tri-, or tetrachloroethane and dichlorobutane), ketones (such as acetone, methyl ethyl ketone, diethyl ketone, and di-t-butyl ketone), and ethers (such as ethyl-n-propyl ether, di-i-propyl ether, di-n-butyl ether, di-t-butyl ether, and dioxane).

Examples of the apparatus used in the melt-kneading method include extruders, Banbury mixers, or kneaders.

Among these methods, preferred are the melting method and the solution method in view of the reactivity of the polymer (A"1) having an unsaturated group introduced thereinto with the ethylenically unsaturated monomer (a2).

The reaction temperature in the melting method can be any temperature at which the polymer (A"1) having an unsaturated group introduced thereinto melts. The reaction temperature is preferably 120 to 260° C., more preferably 130 to 240° C. in view of the reactivity of the polymer (A"1) having an unsaturated group introduced thereinto with the ethylenically unsaturated monomer (a2).

The reaction temperature in the solution method can be any temperature at which the polymer (A"1) having an unsaturated group introduced thereinto dissolves. The reaction temperature is preferably 110 to 210° C., more preferably 120 to 180° C. in view of the reactivity of the polymer (A"1) having an unsaturated group introduced thereinto with the ethylenically unsaturated monomer (a2).

The ring-opening polymerization type polyester can be prepared through ring-opening polymerization of lactone. Examples of the method of preparing a ring-opening polymerization type polyester include a method of adding a base such as metal alkoxide to a lactone dispersed in a solvent.

The dehydration condensation type polyester can be prepared through dehydration condensation of a polyvalent carboxylic acid and a polyhydric alcohol. Examples of the method of preparing dehydration condensation type polyester include a method of heating a mixture of a polyvalent carboxylic acid and a polyhydric alcohol dispersed in a solvent. A reduction in pressure, addition of an acid catalyst, and dehydration may be optionally performed.

The polycarbonate can be prepared through dealcoholization condensation reaction of a polyhydric alcohol and a carbonate compound. Examples of the method of preparing a polycarbonate include a method of heating a polyhydric alcohol and a carbonate compound to about 300° C. to perform an ester exchange reaction, and removing an alcohol generated under reduced pressure.

The weight average molecular weight (hereinafter abbreviated as Mw) of the dispersant for a resin current collector (A) is preferably 2,000 to 300,000, more preferably 5,000 to 200,000, particularly preferably 7,000 to 150,000, most preferably 10,000 to 100,000 in view of the dispersion of the conductive filler (C) and the battery characteristics.

The Mw of the dispersant for a resin current collector (A) can be determined by gel permeation chromatography (GPC) on the following conditions:

Apparatus: Alliance GPC V2000 (manufactured by Waters Corporation)
Solvent: ortho-dichlorobenzene
Standard substance: polystyrene
Sample concentration: 3 mg/ml
Column stationary phase: two columns of PLgel 10 µm and MIXED-B connected in series (manufactured by Polymer Laboratories Ltd.)
Column temperature: 135° C.

The dispersant for a resin current collector (A) according to the present invention comprises the polymer having the resin-philic block (A1) and the conductive filler-philic block (A2). In the dispersant for a resin current collector (A), the weight ratio {(A1)/(A2)} is preferably 50/50 to 99/1, more preferably 60/40 to 98/2, particularly preferably 70/30 to 95/5 in view of the dispersion of the conductive filler (C).

The material for a resin current collector according to the present invention comprises a dispersant for a resin current collector (A), a resin (B), and a conductive filler (C).

The material for a resin current collector according to the present invention contains the dispersant for a resin current collector (A) described above.

Examples of the resin (B) include polyethylene (PE), polypropylene (PP), polymethylpentene (PMP), polycycloolefin (PCO), polyethylene terephthalate (PET), polyether nitrile (PEN), polytetrafluoroethylene (PTFE), styrene butadiene rubber (SBR), polyacrylonitrile (PAN), poly(methyl acrylate) (PMA), poly(methyl methacrylate) (PMMA), polyvinylidene difluoride (PVdF), epoxy resins, silicone resins, and mixtures thereof.

Preferred are polyethylene (PE), polypropylene (PP), polymethylpentene (PMP), and polycycloolefin (PCO), and more preferred are polyethylene (PE), polypropylene (PP), and polymethylpentene (PMP) in view of electrical stability.

The conductive filler (C) is selected from conductive materials. Preferred is use of a material having no conductivity to ions used as a charge migrating medium to prevent permeation of the ions through the current collector.

As used herein, the term "ion" refers to an ion as a charge migrating medium used in batteries, for example, lithium ions in lithium ion batteries and sodium ions in sodium ion batteries.

Specific examples thereof include, but should not be limited to, metals {such as nickel, aluminum, stainless steel (SUS), silver, copper, and titanium}, carbon {such as graphite and carbon black [such as acetylene black, ketjen black, furnace black, channel black, and thermal lamp black]}, and mixtures thereof.

These conductive fillers (C) can be used alone or in combination of two or more. Alloys or metal oxides thereof can also be used. Preferred are nickel, aluminum, stainless steel, carbon, silver, copper, titanium and mixtures thereof, more preferred are nickel, silver, aluminum, stainless steel, and carbon, and particularly preferred are nickel and carbon in view of electrical stability. These conductive fillers (C) may be particulate ceramic materials or resin materials coated with conductive materials (metal conductive fillers (C)) by plating or the like.

The conductive filler (C) is not limited to those having particulate form, and can have any shape (form). The conductive filler (C) can have any form practically used as conductive resin compositions of fillers, such as carbon nanotubes.

The conductive filler (C) can have any average particle size without particular limitations. The average particle size is about 0.01 to 10 µm in view of the electrical characteristics of the batteries. As used herein, the term "particle size" refers to the largest distance L among distances between any two points on the outline of a particle of the conductive filler (C). The "average particle size" can be determined as follows: particles are observed with a scanning electron microscope (SEM) or a transmission electron microscope (TEM), and the average of the particle sizes of the particles observed in several to several tens of viewing fields is calculated. The thus calculated value is defined as the average particle size.

In the material for a resin current collector according to the present invention, the absolute value of the difference between the solubility parameter (hereinafter abbreviated as SP value) of the resin (B) and the SP value of the resin-philic block (A1) in the dispersant for a resin current collector (A), |{SP value of (B)}−{SP value of (A1)}|, is preferably 1.0 $(cal/cm^3)^{1/2}$ or less, more preferably 0.8 $(cal/cm^3)^{1/2}$ or less, particularly preferably 0.5 $(cal/cm^3)^{1/2}$ or less. A difference between the SP values of 1.0 $(cal/cm^3)^{1/2}$ or less attains good dispersion of the conductive filler (C) in the resin current collector.

The SP value is calculated by a Fedors method. The SP value is represented by the following expression:

$$SP\ value(\delta) = (\Delta H/V)^{1/2}$$

where $\Delta H$ represents the molar heat of vaporization (cal) and V represents the molar volume ($cm^3$).

For $\Delta H$ and V, the total molar heat of vaporization ($\Delta H$) and the total molar volume (V) of the atomic group described in "POLYMER ENGINEERING AND SCIENCE, 1974, Vol. 14, No. 2, ROBERT F. FEDORS. (pp. 151 to 153)" can also be used.

The SP value is an index indicating miscibility. In other words, compounds having close SP values are readily mixed with each other (highly miscible), and those having distant SP values are barely mixed with each other.

The content of the dispersant for a resin current collector (A) in the material for a resin current collector is preferably 1 to 20% by weight, more preferably 2 to 15% by weight, particularly preferably 3 to 10% by weight based on the weight of the material for a resin current collector in view of the dispersion of the conductive filler (C).

The content of the resin (B) in the material for a resin current collector is preferably 20 to 98% by weight, more preferably 40 to 95% by weight, particularly preferably 60 to 92% by weight based on the weight of the material for a resin current collector in view of resin strength.

The content of the conductive filler (C) in the material for a resin current collector is preferably 1 to 79% by weight, more preferably 2 to 30% by weight, particularly preferably 5 to 25% by weight based on the weight of the material for a resin current collector in view of the dispersion of the conductive filler (C).

The material for a resin current collector according to the present invention can be prepared by known methods: for example, a known resin is mixed and kneaded with powder to prepare a masterbatch, or components are mixed and kneaded to prepare a thermoplastic resin composition (a composition comprising a dispersant, a filler, and a thermoplastic resin, or a composition comprising a masterbatch and a thermoplastic resin). The material for a resin current collector according to the present invention can be typically prepared by mixing components of pellets or powder with an appropriate mixer, such as a kneader, an internal mixer, a Banbury mixer, or a roll mill.

The components can be added in any order without particular limitations during kneading. The dispersant for a resin current collector (A) may be preliminarily mixed with the conductive filler (C), and the premix may be compounded with the resin (B); or the dispersant for a resin current collector (A), the conductive filler (C), and the resin (B) may be simultaneously mixed.

The resulting material for a resin current collector may be further formed into pellets or powder with a pelletizer.

To the material for a resin current collector, other components can appropriately be added, when necessary, such as crosslinking accelerators (such as aldehyde.ammonia-amine skeleton-containing compounds, thiourea skeleton-containing compounds, guanidine skeleton-containing compounds, thiazole skeleton-containing compounds, sulfene amide skeleton-containing compounds, thiuram skeleton-containing compounds, dithiocarbamate skeleton-containing compounds, xanthogenate skeleton-containing compounds, and dithiophosphate skeleton-containing compounds), crosslinking agents (such as sulfur), colorants, ultraviolet absorbing agents, general-purpose plasticizers (phthalic acid skeleton-containing compounds, trimellitic acid skeleton-containing compounds, phosphate group containing compounds, and epoxy skeleton-containing compounds). The total amount of the other components to be added is preferably 0.0001 to 5% by weight, more preferably 0.001 to 1% by weight relative to the weight of the material for a resin current collector in view of electrical stability.

The resin current collector according to the present invention is prepared by molding the material for a resin current collector. Examples of the molding method include methods such as injection molding, compression molding, calendar molding, slush molding, rotational molding, extrusion molding, blow molding, and film molding (such as casting, tentering, and inflation). The material for a resin current collector can be molded by any method according to the purpose.

The thickness of the resin current collector can be within the range to keep shielding properties against the electrolyte solution and strength during the process. The thickness is preferably 5 to 200 µm, more preferably 10 to 150 µm, particularly preferably 20 to 120 µm. A resin current collector having a thickness within this range can enhance the output power density of the batteries due to a reduction in the weights of the batteries while ensuring the shielding properties against the electrolyte solution, the strength during the process, and the conductivity of the resin current collector.

The resin current collector can have any resistance as long as the electron conductivity in the film thickness direction (lamination direction) required for the current collector for a bipolar secondary battery can sufficiently be ensured. The volume resistivity in the thickness direction (film thickness direction) is preferably within the range of $10^2$ to $10^{-5}$ Ω·cm.

The surface resistivity in the in-plane direction can be determined by a measurement method used in Examples according to JIS K 7194 (resistivity test method performed on conductive plastics by a four probe method). For example, a sheet (sample) cut into a predetermined dimension according to a specification of JIS is measured with a commercially available resistance measuring apparatus which complies with the specification of JIS to determine the surface resistivity of the sample.

The resin current collector according to the present invention can be used as a current collector for bipolar secondary batteries and lithium secondary batteries.

EXAMPLES

The present invention will now be described in detail by way of Examples, but the present invention will not be limited to Examples as long as departing from the gist of the present invention. The term "parts" indicates "parts by weight", and "%" indicates "% by weight" unless otherwise specified.

Production Example 1

Polymer (A'1-1) [polymer composed of 98 mol % propylene and 2 mol % ethylene as constituent units, trade name "SunAllomer PZA20A", manufactured by SunAllomer Ltd., Mn: 100,000.] (100 parts) was charged into a reaction container under a nitrogen atmosphere, and was melted by heating with a mantle heater while nitrogen was being fed to the gas phase portion. The polymer was thermally degraded at 360° C. for 50 minutes with stirring to prepare Polymer (A"1-1) having an unsaturated group. Polymer (A"1-1) had 5 double bonds at molecular terminals per 1,000 carbon atoms and a weight average molecular weight of 5,600.

Production Example 2

The operation was performed in the same manner as in Production Example 1 except that the thermal degradation time in Production Example 1 was changed from 50 minutes to 20 minutes. Polymer (A"1-2) having an unsaturated group was thereby prepared. Polymer (A"1-2) had 0.3 double bonds at molecular terminals per 1,000 carbon atoms and a weight average molecular weight of 93,000.

Production Example 3

The operation was performed in the same manner as in Production Example 1 except that Polymer (A'1-1) (100 parts) used in Production Example 1 was replaced by Polymer (A'1-3) [polymer composed of 80 mol % propylene and 20 mol % 1-butene as constituent units, trade name "TAFMER XM-5080", manufactured by Mitsui Chemicals, Inc., Mn: 90,000.] (100 parts). Polymer (A"1-3) having an unsaturated group was thereby prepared. Polymer (A"1-3) had 4 double bonds at molecular terminals per 1,000 carbon atoms and a weight average molecular weight of 7,000.

Production Example 4

The operation was performed in the same manner as in Production Example 1 except that Polymer (A'1-1) (100 parts) used in Production Example 1 was replaced by Polymer (A'1-4) [polypropylene, trade name "SunAllomer PM600A", manufactured by SunAllomer Ltd.] (100 parts). Polymer (A"1-4) having an unsaturated group was thereby prepared. Polymer (A"1-4) had 4 double bonds at molecular terminals per 1,000 carbon atoms and a weight average molecular weight of 7,000.

Production Example 5

The operation was performed in the same manner as in Production Example 1 except that Polymer (A'1-1) (100 parts) used in Production Example 1 was replaced by Polymer (A'1-5) [polyethylene, trade name "NOVATEC LL UE320", manufactured by Japan Polyethylene Corporation.] (100 parts). Polymer (A"1-5) having an unsaturated group was thereby prepared. Polymer (A"1-5) had 4 double bonds at molecular terminals per 1,000 carbon atoms and a weight average molecular weight of 7,000.

<Dispersant for Resin Current Collector>

Example 1

Polymer (A"1-1) (100 parts), maleic anhydride (11 parts), and xylene (100 parts) were charged into a reaction container, and the reaction container was then purged with nitrogen. These components were heated to 130° C. under a nitrogen stream to be uniformly dissolved. A solution of dicumyl peroxide [trade name "PERCUMYL D", manufactured by NOF CORPORATION] (0.5 parts) dissolved in xylene (10 parts) was dropped to the mixed solution over 10 minutes. The mixed solution was then continuously stirred for 3 hours under refluxing of xylene. After the reaction solution was cooled, a precipitated resin was extracted by centrifugation. Xylene was distilled off under reduced pressure (1.5 kPa, the same applied below) at 80° C. to prepare a dispersant for a resin current collector (A-1) (100 parts). The dispersant (A-1) had a weight average molecular weight of 20,000.

The total concentration of the functional groups in the dispersant (A) was determined from the following expression:

Total concentration (% by weight)=$h \times i/j/k \times 100$ h: molecular weight of 1,3-dioxo-2-oxapropylene group: 72
i: amount of maleic anhydride charged: 11
j: molecular weight of maleic anhydride: 98
k: total amount of Polymer (A"1-1) and maleic anhydride charged: 111

Example 2

The operation was performed in the same manner as in Example 1 except that maleic anhydride (11 parts) used in Example 1 was replaced by acrylic acid (15 parts). A dispersant for a resin current collector (A-2) was thereby prepared. The dispersant (A-2) had a weight average molecular weight of 20,000. The total concentration of the functional groups in the dispersant (A) was also determined in the same manner as in Example 1.

Example 3

The operation was performed in the same manner as in Example 1 except that maleic anhydride (11 parts) used in Example 1 was replaced by aminoethyl acrylate (11 parts). A dispersant for a resin current collector (A-3) was thereby prepared. The dispersant (A-3) had a weight average molecular weight of 20,000. The total concentration of the functional groups in the dispersant (A) was also determined in the same manner as in Example 1.

Example 4

The operation was performed in the same manner as in Example 1 except that maleic anhydride (11 parts) used in Example 1 was replaced by hydroxy ethyl acrylate (11 parts). A dispersant for a resin current collector (A-4) was thereby prepared. The dispersant (A-4) had a weight average molecular weight of 20,000. The total concentration of the functional groups in the dispersant (A) was also determined in the same manner as in Example 1.

Example 5

The operation was performed in the same manner as in Example 1 except that maleic anhydride (11 parts) used in Example 1 was replaced by N-methylacrylamide (11 parts). A dispersant for a resin current collector (A-5) was thereby prepared. The dispersant (A-5) had a weight average molecular weight of 20,000. The total concentration of the functional groups in the dispersant (A) was also determined in the same manner as in Example 1.

Example 6

The operation was performed in the same manner as in Example 1 except that maleic anhydride (11 parts) used in Example 1 was replaced by maleic imide (9 parts). A dispersant for a resin current collector (A-6) was thereby prepared. The dispersant (A-6) had a weight average molecular weight of 20,000. The total concentration of the functional groups in the dispersant (A) was also determined in the same manner as in Example 1.

Example 7

The operation was performed in the same manner as in Example 1 except that Polymer (A"1-1) (100 parts) used in Example 1 was replaced by Polymer (A"1-2) (100 parts). A dispersant for a resin current collector (A-7) was thereby prepared. The dispersant (A-7) had a weight average molecular weight of 100,000. The total concentration of the functional groups in the dispersant (A) was also determined in the same manner as in Example 1.

Example 8

The operation was performed in the same manner as in Example 1 except that Polymer (A"1-1) (100 parts) used in Example 1 was replaced by Polymer (A"1-3) (100 parts) and maleic anhydride (11 parts) was replaced by maleic anhydride (30 parts) and styrene (17 parts). A dispersant for a resin current collector (A-8) was thereby prepared. The dispersant (A-8) had a weight average molecular weight of 20,000. The total concentration of the functional groups in the dispersant (A) was also determined in the same manner as in Example 1.

Example 9

The operation was performed in the same manner as in Example 1 except that Polymer (A"1-1) (100 parts) used in Example 1 was replaced by (A"1-4) (100 parts). A dispersant for a resin current collector (A-9) was thereby prepared. The dispersant (A-9) had a weight average molecular weight of 20,000.

Example 10

The operation was performed in the same manner as in Example 1 except that Polymer (A"1-1) (100 parts) used in Example 1 was replaced by (A"1-5) (100 parts). A dispersant for a resin current collector (A-10) was thereby prepared. The dispersant (A-10) had a weight average molecular weight of 20,000.

Example 11

The operation was performed in the same manner as in Example 1 except that maleic anhydride (11 parts) used in Example 1 was replaced by methyl acrylate (11 parts). A dispersant for a resin current collector (A-11) was thereby prepared. The dispersant (A-11) had a weight average molecular weight of 20,000.

Example 12

The operation was performed in the same manner as in Example 1 except that maleic anhydride (11 parts) used in Example 1 was replaced by acrylonitrile (15 parts). A dispersant for a resin current collector (A-12) was thereby prepared. The dispersant (A-12) had a weight average molecular weight of 20,000.

Example 13

Polycaprolactone [trade name [SOLPLUS DP330], manufactured by Lubrizol Corporation Japan Limited] was prepared, and was used as a dispersant for a resin current collector (A-13). The dispersant for a resin current collector (A-13) had no unsaturated group, and had a weight average molecular weight of 15,000.

Comparative Example 1

Carboxymethyl cellulose sodium salt [manufactured by Dai-ichi Kogyo Seiyaku Co., Ltd., trade name: Celogen F-BSH4] was used as a dispersant for a resin current collector (A-14).

<Material for Resin Current Collector, Resin Current Collector>

Example 14

Polypropylene [trade name "SunAllomer PL500A", manufactured by SunAllomer Ltd] (B-1) (85 parts), acetylene black (C-1) (10 parts), and the dispersant for a resin current collector (A-1) (5 parts) were melt-kneaded with a biaxial extruder at 180° C. and 100 rpm for a residence time of 5 minutes to prepare a material for a resin current collector (Z-1).

The material for a resin current collector (Z-1) thus prepared was rolled with a heat press to prepare a resin current collector (X-1) having a thickness of 100 μm.

Examples 15 to 33

In Example 14, compositions shown in Table 2 each were melt-kneaded to prepare materials for resin current collectors (Z-2) to (Z-20) and resin current collectors (X-2) to (X-20).

TABLE 1

| | Example | | | | | | |
|---|---|---|---|---|---|---|---|
| | 1 | 2 | 3 | 4 | 5 | 6 | 7 |
| Dispersant for resin current collector (A) | A-1 | A-2 | A-3 | A-4 | A-5 | A-6 | A-7 |
| Weight average molecular weight | 20000 | 20000 | 20000 | 20000 | 20000 | 20000 | 100000 |
| Resin-philic block (A1) | Propylene/ethylene copolymer | Propylene/ethylene copolymer | Propylene/ethylene copolymer | Propylene/ethylene copolymer | Propylene/ethylene copolymer | Propylene/ethylene copolymer | Propylene/ethylene copolymer |
| Functional group contained in conductive filler-philic block (A2) | 1,3-Dioxo-2-oxapropylene group | Carboxyl group | Amino group | Hydroxyl group | Amide group | Imide group | 1,3-Dioxo-2-oxapropylene group |
| Weight ratio (A1/A2) | 90/10 | 87/13 | 90/10 | 90/10 | 90/10 | 90/10 | 90/10 |
| Total concentration of functional groups in (A) (% by weight) | 7.3 | 8.2 | 1.5 | 1.5 | 5 | 6 | 7.3 |
| Total molarity of functional groups in (A) (mol/g) | 0.001 | 0.002 | 0.001 | 0.001 | 0.001 | 0.001 | 0.001 |

| | Example | | | | | | Comparative Example |
|---|---|---|---|---|---|---|---|
| | 8 | 9 | 10 | 11 | 12 | 13 | 1 |
| Dispersant for resin current collector (A) | A-8 | A-9 | A-10 | A-11 | A-12 | A-13 | A-14 |
| Weight average molecular weight | 20000 | 20000 | 20000 | 20000 | 20000 | 15000 | 100000 |
| Resin-philic block (A1) | Propylene/1-bulene copolymer | Polypropylene | Polyethylene | Propylene/ethylene copolymer | Propylene/ethylene copolymer | Pentylene (—C$_5$H$_{10}$—) | — |
| Functional group contained in conductive filler-philic block (A2) | 1,3-Dioxo-2-oxapropylene group | 1,3-Dioxo-2-oxapropylene group | 1,3-Dioxo-2-oxapropylene group | Ester group | Cyano group | Ester group | — |
| Weight ratio (A1/A2) | 68/32 | 90/10 | 90/10 | 90/10 | 87/13 | 61/39 | — |
| Total concentration of functional groups in (A) (% by weight) | 15 | 7.3 | 7.3 | 8.1 | 6.4 | 39 | — |
| Total molarity of functional groups in (A) (mol/g) | 0.002 | 0.001 | 0.001 | 0.002 | 0.002 | 0.001 | — |

Comparative Examples 2 to 3

In Example 14, compositions shown in Table 2 each were melt-kneaded to prepare materials for a resin current collectors (Z-21) to (Z-22) and resin current collectors (X-21) to (X-22).

TABLE 2

| | | | Example 14 | 15 | 16 | 17 | 18 | 19 | 20 | 21 | 22 | 23 | 24 |
|---|---|---|---|---|---|---|---|---|---|---|---|---|---|
| Compounding composition (parts by weight) | Dispersant for resin current collector (A) | A-1 | 5 | | | | | | | | | | 5 |
| | | A-2 | | 5 | | | | | | | | | |
| | | A-3 | | | 5 | | | | | | | | |
| | | A-4 | | | | 5 | | | | | | | |
| | | A-5 | | | | | 5 | | | | | | |
| | | A-6 | | | | | | 5 | | | | | |
| | | A-7 | | | | | | | 5 | | | | |
| | | A-8 | | | | | | | | 5 | | | |
| | | A-9 | | | | | | | | | 5 | | |
| | | A-10 | | | | | | | | | | 5 | |
| | | A-11 | | | | | | | | | | | |
| | | A-12 | | | | | | | | | | | |
| | | A-13 | | | | | | | | | | | |
| | | A-14 | | | | | | | | | | | |
| | Resin (B) | B-1 | 85 | 85 | 85 | 85 | 85 | 85 | 85 | | 85 | | |
| | | B-2 | | | | | | | | 85 | | 85 | |
| | | B-3 | | | | | | | | | | | 85 |
| | | B-4 | | | | | | | | | | | |
| | Conductive filler (C) | C-1 | 10 | 10 | 10 | 10 | 10 | 10 | | 10 | 10 | 10 | 10 |
| | | C-2 | | | | | | | 10 | | | | |
| | | C-3 | | | | | | | | | | | |
| | | C-4 | | | | | | | | | | | |
| Material for resin current collector | | | Z-1 | Z-2 | Z-3 | Z-4 | Z-5 | Z-6 | Z-7 | Z-8 | Z-9 | Z-10 | Z-11 |
| Difference in SP value between (A1) and (B) | | | 0.1 or less | 0.1 or less | 0.1 or less | 0.1 or less | 0.1 or less | 0.1 or less | 0.1 or less | 0.2 | 0.1 or less | 0.1 or less | 0.1 |
| Resin current collector | | | X-1 | X-2 | X-3 | X-4 | X-5 | X-6 | X-7 | X-8 | X-9 | X-10 | X-11 |
| Electric resistance (Ω · cm) | | | 200 | 200 | 200 | 200 | 200 | 200 | 200 | 200 | 200 | 200 | 200 |
| Dispersion | | | A | A | A | A | A | A | A | A | A | A | A |

| | | | Example 25 | 26 | 27 | 28 | 29 | 30 | 31 | 32 | 33 | Comparative Example 2 | 3 |
|---|---|---|---|---|---|---|---|---|---|---|---|---|---|
| Compounding composition (parts by weight) | Dispersant for resin current collector (A) | A-1 | 10 | | | 5 | 5 | 2 | 2 | | | | |
| | | A-2 | | | | | | | | | | | |
| | | A-3 | | | | | | | | | | | |
| | | A-4 | | | | | | | | | | | |
| | | A-5 | | | | | | | | | | | |
| | | A-6 | | | | | | | | | | | |
| | | A-7 | | | | | | | | | | | |
| | | A-8 | | | | | | | | | | | |
| | | A-9 | | | | | | | | | | | |
| | | A-10 | | | | | | | | | | | |
| | | A-11 | | 5 | | | | | | | | | |
| | | A-12 | | | 5 | | | | | | | | |
| | | A-13 | | | | | | | | 5 | 2 | | |
| | | A-14 | | | | | | | | | | 5 | 5 |
| | Resin (B) | B-1 | | 85 | 85 | 75 | 70 | 27 | 27 | | | 85 | |
| | | B-2 | | | | | | | | | | | |
| | | B-3 | 70 | | | | | | | | | | |
| | | B-4 | | | | | | | | 70 | 27 | | 85 |
| | Conductive filler (C) | C-1 | 20 | 10 | 10 | 20 | 25 | | | 25 | | 10 | 10 |
| | | C-2 | | | | | | | | | | | |
| | | C-3 | | | | | | 71 | | | 71 | | |
| | | C-4 | | | | | | | 71 | | | | |
| Material for resin current collector | | | Z-12 | Z-13 | Z-14 | Z-15 | Z-16 | Z-17 | Z-18 | Z-19 | Z-20 | Z-21 | Z-22 |
| Difference in SP value between (A1) and (B) | | | 0.1 | 0.1 or less | 0.1 or less | 0.1 or less | 0.1 or less | 0.1 or less | 0.1 or less | 0.1 or less | 0.1 or less | — | — |
| Resin current collector | | | X-12 | X-13 | X-14 | X-15 | X-16 | X-17 | X-18 | X-19 | X-20 | X-21 | X-22 |
| Electric resistance (Ω · cm) | | | 20 | 200 | 200 | 20 | 5 | 9 | 13 | 8 | 12 | 950 | 680 |
| Dispersion | | | A | A | A | A | A | A | A | A | A | B | B |

In Table 2, the followings were used as the resin (B) and the conductive filler (C):

(B-1): polypropylene [trade name "SunAllomer PL500A", manufactured by SunAllomer Ltd.]

(B-2): polyethylene [trade name "NOVATEC LL UE320", manufactured by Japan Polyethylene Corporation]

(B-3): styrene butadiene rubber [trade name "Nipol 1502", manufactured by ZEON Corporation]

(B-4): polyethylene terephthalate [trade name "Kurapet KS460K", manufactured by Kuraray Co., Ltd.]

(C-1): acetylene black [manufactured by Denka Company Limited]

(C-2): ketjen black [manufactured by Lion Corporation]

(C-3): nickel particles [Type 255, manufactured by Vale Japan Limited]

(C-4): SUS 361L particles [PF-3F, manufactured by EPSON ATMIX Corporation]

The resin current collectors (X-1) to (X-22) prepared in Examples 14 to 33 and Comparative Examples 2 to 3 were measured for the electric resistance and the dispersion of the conductive filler according to the following procedure.

<Electric Resistance>

The electric resistance (surface resistivity) was measured in accordance with JIS K 7194 (testing method for resistivity of conductive plastics with a four-point probe array). The results of evaluation are shown in Table 2.

<Dispersion of Conductive Filler>

The state of the conductive filler dispersed in the resin current collector was observed with an electron microscope to evaluate the state according to the following criteria:

A; No coagulated objects of 500 nm or more are present.

B; Although the conductive filler is uniformly dispersed, coagulated objects of 500 nm or more are partially present in a proportion of less than 50% of the number of conductive filler particles.

C; The conductive filler is not uniformly dispersed, coagulated objects of 500 nm or more are present in a proportion of 50 to 100% of the number of the conductive filler particles.

The results in Table 2 evidently show that the dispersant for a resin current collector according to the present invention is highly capable of dispersing the conductive filler. The results in Table 2 also show that the resin current collector containing the dispersant for a resin current collector according to the present invention has high electrical characteristics.

INDUSTRIAL APPLICABILITY

The dispersant for a resin current collector according to the present invention is highly capable of dispersing the conductive filler, and can attain resin current collectors having high electrical characteristics. The resin current collector prepared according to the present invention is useful as a current collector particularly for bipolar secondary batteries and lithium secondary batteries used in mobile phones, personal computers, hybrid electric vehicles, and electric vehicles.

The invention claimed is:

1. A resin current collector for lithium secondary batteries comprising a material, the material comprising dispersant (A), a resin (B), and a conductive filler (C), the dispersant (A) comprising a polymer having a resin-philic block (A1) and a conductive filler-philic block (A2), wherein the polymer having a resin-philic block (A1) and a conductive filler-philic block (A2) is selected from the group consisting of a polymer wherein the resin-philic block (A1) is a polymer block composed of an olefin (a1) having 2 to 30 carbon atoms as an essential constituent monomer, and the conductive filler-philic block (A2) is a polymer block composed of an ethylenically unsaturated monomer (a2) as an essential constituent monomer, the ethylenically unsaturated monomer (a2) having at least one functional group selected from the group consisting of a carboxyl group, a 1,3-dioxo-2-oxapropylene group, and an ester group, wherein a total concentration of a carboxyl group, a 1,3-dioxo-2-oxapropylene group, an ester group in the dispersant (A) is 1 to 40% by weight based on a weight of the dispersant (A), wherein the dispersant (A) is contained in an amount of 1 to 20% by weight, and the resin (B) is contained in an amount of 20 to 98% by weight, based on a weight of the material for a resin current collector, and wherein the conductive filler (C) comprises metal particles or carbon particles, when the conductive filler (C) comprises metal particles, the conductive filler (C) is contained in an amount of 71 to 79% by weight, based on a weight of the material for a resin current collector, and when the conductive filler (C) comprises carbon particles, the conductive filler (C) is contained in an amount of 10 to 79% by weight, based on a weight of the material for a resin current collector.

2. The resin current collector according to claim 1, wherein the dispersant (A) has a weight average molecular weight of 10,000 to 100,000.

3. The resin current collector according to claim 1, wherein the resin-philic block (A1) is at least one block selected from the group consisting of a polymer block composed of ethylene and propylene as essential constituent monomers, a polyethylene block, and a polypropylene block.

4. The resin current collector according to claim 1, wherein the dispersant (A) is a polymer wherein the ethylenically unsaturated monomer (a2) is added into a polymer (A"1), wherein the polymer (A"1) has an unsaturated group and is a thermally degraded polymer of the olefin (a1).

5. The resin current collector according to claim 1, wherein a weight ratio {(A1)/(A2)} of the resin-philic block (A1) to the conductive filler-philic block (A2) is 50/50 to 99/1.

6. The resin current collector according to claim 1, wherein an absolute value of a difference between a solubility parameter of the resin (B) and a solubility parameter of the resin-philic block (A1) in the dispersant (A), |{solubility parameter of (B)}−{solubility parameter of (A1)}|, is 1.0 $(cal/cm^3)^{1/2}$ or less.

7. The resin current collector according to claim 1, wherein the resin (B) is polyethylene (PE), polypropylene (PP), polymethylpentene (PMP), polycycloolefin (PCO), polyethylene terephthalate (PET), polyether nitrile (PEN), polytetrafluoroethylene (PTFE), styrene butadiene rubber (SBR), polyacrylonitrile (PAN), poly (methyl acrylate) (PMA), poly(methyl methacrylate) (PMMA), polyvinylidene difluoride (PVdF), an epoxy resin, a silicone resin, or a mixture thereof.

8. The resin current collector according to claim 1, wherein the conductive filler (C) is nickel, aluminum, stainless steel, carbon, silver, copper, titanium, or a mixture thereof.

9. The resin current collector according to claim 1, wherein the conductive filler (C) has an average particle size of 0.01 to 10 μm.

10. The resin current collector according to claim 1, wherein the resin current collector has a thickness of 5 to 200 μm.

* * * * *

UNITED STATES PATENT AND TRADEMARK OFFICE
CERTIFICATE OF CORRECTION

PATENT NO. : 10,135,073 B2
APPLICATION NO. : 14/903314
DATED : November 20, 2018
INVENTOR(S) : Hiroshi Fukumoto It is certified that error appears in the above-identified patent and that said Letters Patent is hereby corrected as shown below:

In the Claims

In Column 24, Line 15, change:
"1,3-dioxyo-2-oxapropylene group, an ester group in"
To:
--1,3-dioxyo-2-oxapropylene group, and an ester group in--

In Column 24, Lines 17-18, change:
"weight of the dispersant (A), wherein the dispersant (A) is contained in"
To:
--weight of the dispersant (A),
    wherein the ethylenically unsaturated monomer (a2) is contained in
    monomers forming the conductive filler-philic block (A2) in a proportion of
    50 to 100% by weight based on a weight of the conductive filler-philic
    block (A2),
wherein the dispersant (A) is contained in--

Signed and Sealed this
Nineteenth Day of March, 2019

Andrei Iancu
*Director of the United States Patent and Trademark Office*